United States Patent
Rohner et al.

(10) Patent No.: US 10,132,653 B2
(45) Date of Patent: Nov. 20, 2018

(54) CAPACITIVE LINEAR ENCODER

(71) Applicant: HEXAGON TECHNOLOGY CENTER GMBH, Heerbrugg (CH)

(72) Inventors: Marcel Rohner, Heiden (CH); Ingo Bednarek, Heerbrugg (CH); Rainer Wohlgenannt, Klaus (AT); Lukas Baumann, St. Gallen (CH)

(73) Assignee: HEXAGON TECHNOLOGY CENTER GMBH, Heerbrugg (CH)

( * ) Notice: Subject to any disclaimer, the term of this patent is extended or adjusted under 35 U.S.C. 154(b) by 0 days.

(21) Appl. No.: 14/958,802

(22) Filed: Dec. 3, 2015

(65) Prior Publication Data
US 2016/0161292 A1    Jun. 9, 2016

(30) Foreign Application Priority Data
Dec. 4, 2014 (EP) ..................................... 14196331

(51) Int. Cl.
*G01R 27/26* (2006.01)
*G01D 5/241* (2006.01)

(52) U.S. Cl.
CPC ................................. *G01D 5/2415* (2013.01)

(58) Field of Classification Search
CPC ..... G01R 27/2605; G01R 15/16; G06F 3/044; G06F 2203/04103; G06F 3/0416
USPC ................... 324/679, 658, 686, 661
See application file for complete search history.

(56) References Cited

U.S. PATENT DOCUMENTS

| | | | |
|---|---|---|---|
| 5,304,937 A | 4/1994 | Meyer | |
| 6,274,958 B1 | 8/2001 | Kobayashi et al. | |
| 6,892,590 B1 | 5/2005 | Andermo | |
| 6,940,278 B2 | 9/2005 | Pettersson et al. | |
| 8,049,519 B2 | 11/2011 | Nielsen et al. | |
| 2004/0210801 A1* | 10/2004 | Prasad | G11C 27/024 714/700 |
| 2004/0212431 A1* | 10/2004 | Butler | H03F 3/45632 330/261 |
| 2010/0207795 A1* | 8/2010 | Waki | H03M 1/0658 341/143 |
| 2013/0093439 A1 | 4/2013 | Ulmen et al. | |
| 2017/0060150 A1* | 3/2017 | Stefanski | G05D 23/27 |
| 2018/0036740 A1* | 2/2018 | Nelson | B02C 19/18 |

(Continued)

FOREIGN PATENT DOCUMENTS

| | | |
|---|---|---|
| CN | 1170265 A | 1/1998 |
| CN | 1894571 A | 1/2007 |
| CN | 101427107 A | 5/2009 |

(Continued)

OTHER PUBLICATIONS

European Search Report dated May 21, 2015 as received in Application No. EP 14 19 6331.

*Primary Examiner* — Giovanni Astacio-Oquendo
(74) *Attorney, Agent, or Firm* — Maschoff Brennan (57) ABSTRACT

Some embodiments of the invention include a capacitive linear encoder for determining positions comprising a scale and a read head for capacitively scanning the scale, wherein scale and read head are movable relative to one another. The scale has at least one, preferably capacitive, position reference marker. On the basis of the position references provided by the capacitive position reference marker, the positions are locatable in absolute terms and verifiable.

20 Claims, 4 Drawing Sheets

(56) References Cited

U.S. PATENT DOCUMENTS

2018/0059176 A1\* 3/2018 Ding ................ G01R 31/2891

FOREIGN PATENT DOCUMENTS

| | | |
|---|---|---|
| DE | 197 15 078 A1 | 10/1998 |
| EP | 0538184 A1 | 4/1993 |
| EP | 1 173 730 B1 | 12/2004 |
| JP | S6241832 A | 2/1987 |
| JP | 06 241832 A | 9/1994 |
| JP | 2549796 B2 | 10/1996 |
| WO | 02/21081 A1 | 3/2002 |

\* cited by examiner

CAPACITIVE LINEAR ENCODER

FIELD OF THE INVENTION

The invention relates to a capacitive linear encoder to a method for determining positions using such a linear encoder, and to a computer program product.

BACKGROUND

Linear encoders for precise distance measurement are required in many fields of application in which the position of an element movable along a linear path, e.g. the position of a machine component on a linear axis, is to be determined. The positions detected in this case can be used as position values for measurement purposes, or else for positioning components by means of a drive with position control loop. Such linear position encoders are correspondingly found in apparatuses such as coordinate measuring machines (CMM), geodetic apparatuses, robot arms or hydraulic actuators.

For this purpose, a linear encoder comprises a scale and a read head for scanning or reading the scale, which are movable in a feed direction relative to one another, and also a control and evaluation unit for regulating measurement processes and for assigning a scanning signal generated by the read head to a position. In this case, dependent on requirements and structural possibilities, either the read head extending in the feed direction is stationary and the scale is movable, e.g. by the scale being connected to a movable object whose linear movement is intended to be detected; or the scale extending in the feed direction is fixedly positioned and the read head is moved relative thereto, for example by virtue of the fact that a measurement slide of a coordinate measuring machine that is provided with a read head is moved over a scale carrier fitted to a measurement table. In principle, different physical principles of action are suitable for scanning purposes, such as e.g. optical or capacitive scanning. In this case, capacitive linear encoders, compared with comparable optical linear encoders, afford the advantage of a lower power consumption and more cost-effective construction.

Incremental and absolute linear encoders are known. In the case of absolute systems, a position is directly assignable to each relative position of read head with respect to scale by virtue of the scale having over the entire measurement section an absolute position code composed of unique code words, which is assignable to exactly one position by a control and evaluation unit. In the case of linear encoders with incremental determination of positions, by contrast, the scanning signals are not unique, but rather are repeated many times over the entire measurement region. The distance to which an increment corresponds is stored in a control and evaluation unit of the linear encoder. Consequently, the distance covered during a relative movement of scale and read head and hence a relative position can be determined by counting down the increments. In order to locate such a relative position in absolute terms, a defined zero position as absolute reference point is taken as a basis during a relative movement. Such a zero position or zero point is defined by a position reference marker detectable by the read head on the scale (or on the read head in the case of stationary scale). In capacitive measurement systems, such a position reference marker is usually based on a magnetic or inductive principle of action, rather than on a capacitive principle of action.

EP 1173730 B1, by contrast, discloses a capacitive linear encoder comprising a position reference marker defining a zero point that is based on a capacitive principle of action. The linear encoder comprises a scale with rectangular receiver electrodes which are capacitively scannable by a read head by means of a rectangular receiver plate. As position reference marker that indexes the absolute reference point, use is made of two additional rectangular receiver electrodes adjacent to one another on the scale, which have a greater width, understood as extent in the feed direction, than the other receiver electrodes serving for defining the increments. The zero point is indexed by means of a joint evaluation both of the difference and of the sum of the capacitive signals which arise when scanning the two additional receiver electrodes.

However, particularly in the case of capacitive linear encoders having a relatively long measurement section, the absolute location of the positions on the basis of the increments counted down, proceeding from the zero point, is naturally susceptible to errors, for example as a result of erroneous increment quantities or errors when counting down the increments, e.g. as a result of noisy or disturbed scanning signals. In the case of linear encoders according to the prior art, avoiding or compensating for such erroneous absolute position values requires scales which are manufactured and mounted highly precisely, complex means for electrical shielding, as proposed e.g. in EP 1173730 B1, and/or complex error correction measures. Such measures are costly.

SUMMARY

Some embodiments of the invention provide an improved capacitive linear encoder.

Some embodiments of the invention provide a capacitive linear encoder comprising improved capacitive position reference markers.

Some embodiments of the invention provide a capacitive linear encoder having simplified electrical shielding.

Some embodiments of the invention provide a method for determining positions for such a linear encoder.

Some embodiments of the present invention relates to a capacitive linear encoder for determining positions along a feed direction. The linear encoder comprises a read head having a multiplicity of first coupling electrodes, in particular emitter electrodes, and a scale having a multiplicity of second coupling electrodes, in particular receiver electrodes, wherein scale and read head are displaceable relative to one another in the feed direction, and the scale is scannable by means of the read head by means of a capacitive principle of action. Furthermore, the linear encoder comprises a control and evaluation unit. The first coupling electrodes have at least three coupling signal phases offset with respect to one another. In other words, the first coupling electrodes are classified in at least three groups, wherein each first coupling electrode is associated with exactly one group. Four phases offset with respect to one another in each case by one quarter are preferably used. The sequence of the coupling signal phases or of the first coupling electrodes is defined by a phase permutation, such that in each case a series of adjacent first coupling electrodes form a phase permutation interval, referred to hereinafter as P-interval for short, wherein the read head optionally has a number M of identical P-intervals. In this case, as known from the prior art, for example U.S. Pat. No. 6,940,278 B2, a phase permutation is understood to mean the principle that, in comparison with the simplest possibility of the phase sequence, in which the respective directly adjacent first coupling electrode has the respective directly next phase, the sequence of the phases is changed over a certain section corresponding to a P-interval, with maintenance of a uniform distribution of the phases over the entire series of coupling electrodes.

The second coupling electrodes are preferably all fashioned identically, that is to say that they are structurally identical and have an identical shape and size (width, length, thickness). The width of the first coupling electrodes and the width of the second coupling electrodes are coordinated with one another, wherein width of the coupling electrodes is understood to mean the maximum or average extent in the feed direction, and, correspondingly, the length thereof is understood to mean the maximum or average extent transversely with respect to the feed direction. By means of capacitive coupling, under the control of the control and evaluation unit, temporally changing coupling signals are exchanged between the first and second coupling electrodes.

The exchange of coupling signals between the first and second coupling electrodes is dependent on the relative position of scale with respect to read head, for which reason, by means of signal evaluation of the coupling signals transmitted between the first and second coupling electrodes and information stored in the control and evaluation unit, a position as relative position of read head with respect to scale is determinable by the control and evaluation unit. Preferably, the coupling electrodes and coupling signals are coordinated with one another, preferably by means of their shaping, in such a way that a sinusoidal profile of the coupling signals is generated by a displacement of the scale relative to the read head. In this case, the position determination is carried out according to an incremental measurement principle. For a differential signal evaluation, the second coupling electrodes are divided into at least two mutually reciprocal types. In the case of preferably two types, all "even" coupling electrodes carry "positive" coupling signals and all "odd" coupling electrodes carry inverse "negative" coupling signals relative thereto. In this case, the respective next but one second coupling electrodes of the same type, in other words the second coupling electrodes that are directly adjacent in the feed direction, are mutually reciprocal. For a simple construction of the scale, the second coupling electrodes of one type are preferably aligned in opposite directions with respect to the coupling electrodes of the other type, that is to say rotated by 180° with respect to one another.

The scale is embodied in a passive fashion, that is to say that the scale has no electrical contacting, e.g. in the form of supply lines or signal lines, from outside. For tapping off the coupling signals, the linear encoder or the scale comprises signal transfer means for transmitting the coupling signals between scale and read head. In this case, the transmission of coupling signals by means of the signal transfer means is not position-dependent like the exchange of coupling signals between the first and second coupling electrodes.

The scale furthermore has at least one position reference marker. The position reference marker is preferably capacitive, that is to say that the position reference marker is scannable or detectable according to the same principle of action as the second coupling electrodes. In this case, a respective position reference marker is formed by means of the signal transfer means. For this purpose, one or a plurality of the signal transfer means are modified, to be precise at a location of the scale which defines a position reference. For identifying a position reference marker, the position reference marker is identifiable by means of the identification signals controlled by the control and evaluation unit.

To put it generally, by means of a position reference marker situated at a defined location of the scale, a position reference is in each case defined for referencing the positions. Optionally, a position reference marker serves for defining an absolute reference point of the scale, e.g. a zero point or other absolute reference point, whereby the incrementally determined positions are locatable in absolute terms. Optionally, therefore, an absolute reference is provided by one of the position reference markers, whereby the positions are determinable in absolute terms for example proceeding from the zero point. Additionally or alternatively, one or a plurality of position reference markers serve for verifying the positions located in absolute terms, that is to say that the absolute positions are checkable by means of the position reference marker or position reference markers. In other words, such a position reference marker in each case provides a position reference on the basis of which the faultiness of a position which is determined in absolute terms on the basis of coupling signals transmitted between the first and second coupling electrodes and an absolute reference point can be determined. In this case, an absolute reference point is preferably formed by a capacitive position reference marker according to the invention, e.g. by the position reference marker itself that serves for verification or by a second position reference marker.

If the scale has a plurality of position reference markers, then the latter are distributed on the scale in a defined manner in the feed direction, that is to say that position reference markers are found at defined distances in all regions of the scale. A minimum density is complied with here in the case of the distribution, that is to say that averaged over the entire scale and/or per section of the scale per unit length there are a minimum number of position reference markers, wherein optionally a maximum distance between the position reference markers is not exceeded. The individual distances between the position reference markers and respectively the distance between each individual position reference marker and the zero point are stored in the control and evaluation unit. Preferably, the distribution of the position reference markers on the entire scale is uniform, that is to say that the distance in the feed direction of the position reference markers with respect to one another is constant, that is to say that all the position reference markers are at the same distance from one another, the in that case single distance value being stored in the control and evaluation unit.

In preferred embodiments, the linear encoder comprises signal transfer means having a capacitive principle of action, which are embodied as transfer electrodes. In this case, the scale has a plurality of second transfer electrodes per type of the second coupling electrodes, and the read head has at least one first transfer electrode per type. First transfer electrodes and second transfer electrodes of the same type couple capacitively to one another. Optionally, the extents transversely with respect to the feed direction of the first and second transfer electrodes are different. This results in a robustness relative to deviations from an ideal position transversely with respect to the feed direction from the read head to the scale. Each second transfer electrode is electrically conductively connected to one or a plurality of second coupling electrodes, such that coupling signals pass from the second coupling electrodes via the second transfer electrodes to the first transfer electrodes, or conversely from the first transfer electrodes via the second transfer electrodes to the second coupling electrodes. Optionally, each second transfer electrode is electrically conductively connected to a sequence of second coupling electrodes that are adjacent in the feed direction, wherein with regard to an optimized coupling signal feedback the length of such a sequence, understood as extent in the feed direction, advantageously corresponds to the length over which a P-interval extends on the read head.

In embodiments comprising transfer electrodes, the position reference markers are optionally formed by means of modified second transfer electrodes. According to the invention, therefore, position reference markers are provided by second transfer electrodes being modified, to be precise preferably by at least two second transfer electrodes of the same type which are adjacent to one another being electrically conductively connected to one another. Alternatively, conversely, second transfer electrodes are modified and form position reference markers by an electrically conductive connection between at least two adjacent transfer electrodes being interrupted or a transfer electrode being separated into at least two parts isolated from one another. The provision of position referencing by position reference markers is therefore effected with the aid of second transfer electrodes whose extent in the feed direction is e.g. double the magnitude relative to the other second transfer electrodes and which are connected to a number of second coupling electrodes that is double the magnitude relative to the other second transfer electrodes. For position reference marker identification, the read head in these embodiments has at least one third coupling electrode, preferably at least one third coupling electrode per type of the second coupling electrodes, that is to say a total of at least two third coupling electrodes. The third coupling electrode is suitable for transmitting temporally changing identification signals which are transmittable by means of capacitive coupling between the third coupling electrode and the second transfer electrodes, that is to say a position reference marker. A respective position reference marker is identified on the basis of the identification signals.

As a further option, the third coupling electrode is fitted to the read head in such a way that the third coupling electrode is situated upstream or downstream of the first transfer electrode in relation to the feed direction. If the read head has at least two third coupling electrodes per type, these are fitted symmetrically, such that one third coupling electrode is situated upstream of the first transfer electrode, and one downstream thereof. In this case, the first transfer electrode and the third coupling electrode are electrically isolated from one another, i.e. not connected to one another by electrical contacts.

The third coupling electrode and the modified second transfer electrodes serving as position reference markers are coordinated with one another in such a way that the short-circuited second transfer electrodes serve for communicating the identification signals between the third coupling electrode and the first transfer electrode, such that coupling signals transmitted by the third coupling electrode are fed to the control and evaluation unit only in the presence of a capacitive position reference marker in the form of the short-circuited second transfer electrodes. Alternatively, the second transfer electrodes are modified to the effect that coupling signals transmitted by the third coupling electrode are fed to the control and evaluation unit exclusively outside the presence of a capacitive position reference marker, for example by the second transfer electrodes not being capacitively coupling, or the modification being such that transfer electrodes are omitted at this location. Such a coordination is preferably achieved by the short-circuited second transfer electrodes having an extent in the feed direction which is of a magnitude such that with a constant relative position of read head with respect to scale the short-circuited second transfer electrodes are capacitively couplable both to the respective first transfer electrode and to the third coupling electrode. Such a transmission of the identification signals takes place exclusively in the presence of the short-circuited second transfer electrodes. Consequently, the position reference markers formed by the short-circuited second transfer electrodes are detectable and identifiable. In this case, presence should be understood to mean that such a relative position of read head with respect to scale is present wherein the third coupling electrode together with the first transfer electrodes and short-circuited second transfer electrodes are at least partly opposite one another, such that the latter couple capacitively to the third coupling electrode and the first transfer electrode.

Optionally, the read head has at least one reference surface as normalization reference for normalizing the distance between read head and scale and/or the distance between the first and second coupling electrodes and thus the distance-dependent capacitive coupling signals.

As a further optional feature, the read head has shielding electrodes for electrically shielding the first transfer electrodes, whereby disturbances of the coupling signals that are caused by external or internal sources are at least reduced. Said shielding electrodes surround the first transfer electrodes completely, that is to say from all sides, or partly, e.g. only at edges of the first transfer electrodes n that are situated at the outer area on the read head in the feed direction.

Particularly advantageously, in some embodiments, at least some shielding electrodes are identical to the third coupling electrodes, that is to say that the third coupling electrodes serve both for identifying the position reference markers and for shielding the first transfer electrodes. Advantageously with regard to the electrical shielding, a read head then has at least four third coupling electrodes, two per type, which are arranged in pairs symmetrically around the respective first transfer electrodes, such that one third coupling electrode is disposed upstream of the first transfer electrode in the feed direction and one third coupling electrode is disposed downstream of the first transfer electrode. Consequently, a respective pair of third coupling electrodes shields the respective first transfer electrode in relation to the feed direction at both ends of the read head. In this case, the read head preferably has, between the third coupling electrodes and the first transfer electrode, respectively further shielding electrodes serving for electrically shielding the first transfer electrode.

For the compensation of signal crosstalk, reduction or shielding of external disturbance signals and/or changes in the distance between the first and second coupling electrodes and thus the capacitive coupling, some embodiments comprise at least one electrically shielding protective electrode which completely or partly surrounds the first coupling electrodes. Optionally, the scale also has at least one electrically shielding protective electrode for reducing external disturbance signals.

The first coupling electrodes are shaped in a sine-like fashion for a sine-like signal characteristic of the coupling signals in one development of the linear encoder according to the invention, wherein the second coupling electrodes coupling to them have a rectangular shape. Alternatively, the second coupling electrodes are shaped in a sine-like fashion. For the densest possible arrangement of the first coupling electrodes on the read head, as a further option the mutually facing edges of directly adjacent first coupling electrodes are shaped such that they are approximately straight. In this case, the directly adjacent first coupling electrodes are aligned in opposite directions with respect to one another.

In one alternative embodiment, the linear encoder comprises a read head having a multiplicity of first coupling electrodes, in particular emitter electrodes, and a scale having a multiplicity of second coupling electrodes, in particular receiver electrodes, wherein scale and read head are displaceable relative to one another in the feed direction, and the scale is scannable by means of the read head by means of a capacitive principle of action. Furthermore, the linear encoder comprises a control and evaluation unit. The first coupling electrodes have at least three coupling signal phases offset with respect to one another. Four phases offset with respect to one another in each case by one quarter are preferably used. The sequence of the coupling signal phases is defined by a phase permutation, such that in each case a series of adjacent first coupling electrodes form a phase permutation interval, referred to hereinafter as P-interval for short, wherein the read head optionally has a number M of identical P-intervals.

The second coupling electrodes of the alternative embodiment are preferably all fashioned identically, that is to say that they are structurally identical and have an identical shape and size (width, length, thickness). The width of the first coupling electrodes and the width of the second coupling electrodes are coordinated with one another, wherein width of the coupling electrodes is understood to mean the maximum or average extent in the feed direction, and, correspondingly, the length thereof is understood to mean the maximum or average extent transversely with respect to the feed direction. By means of capacitive coupling, under the control of the control and evaluation unit temporally changing coupling signals are exchanged between the first and second coupling electrodes. By means of signal evaluation of the coupling signals exchanged between the first and second coupling electrodes and information stored in the control and evaluation unit, a position as relative position of read head with respect to scale is determinable by the control and evaluation unit. In this case, the position determination is carried out according to an incremental measurement principle. For a differential signal evaluation, the second coupling electrodes are divided into at least two mutually reciprocal types, that is to say that every second coupling electrode carries e.g. "positive" coupling signals or inverse "negative" coupling signals relative thereto. In this case, the respective next but one second coupling electrodes of the same type, in other words the second coupling electrodes that are directly adjacent in the feed direction, are mutually reciprocal.

The scale of the alternative embodiment is embodied in a passive fashion, that is to say that the scale has no electrical contacting, e.g. in the form of supply lines or signal lines, from outside. For tapping off the coupling signals, the linear encoder or the scale comprises signal transfer means for transmitting the coupling signals between scale and read head. In this case, the transmission of coupling signals by means of the signal transfer means is not position-dependent like the exchange of coupling signals between the first and second coupling electrodes.

In the alternative embodiment, transfer electrodes serve as signal transfer means having a capacitive principle of action, wherein the scale has a plurality of second transfer electrodes per type of the second coupling electrodes, and the read head has at least one first transfer electrode per type of the second coupling electrodes. Each second transfer electrode is electrically conductively connected to one or a plurality of second coupling electrodes of the same type and couples capacitively to the at least one first transfer electrode of the same type. Furthermore, the read head has shielding electrodes for electrically shielding the first transfer electrodes. Preferably, the shielding electrodes are fitted in pairs in a manner disposed upstream and downstream of a respective first transfer electrode in the feed direction, such that a respective pair of shielding electrodes can shield the respective first transfer electrode in relation to the feed direction at both ends of the read head. In this case, according to the invention, the extent in the feed direction of the arrangement of the first coupling electrodes is greater than that of the first transfer electrodes, such that a portion of the first coupling electrodes extends beyond the first transfer electrodes in the feed direction. As a result, edge effects are advantageously reduced or avoided. Optionally, the extent in the feed direction of the arrangement of the first coupling electrodes is at least approximately of the same magnitude as the extent in the feed direction of the respective first transfer electrodes and the shielding electrodes thereof together. If the shielding electrodes are present in pairs, then the series of the first coupling electrodes extends beyond both ends of the first transfer electrodes along the shielding electrodes of both sides.

The present invention advantageously provides a capacitive linear encoder which provides capacitive position reference markers in a simple manner. With the linear encoder according to the invention, positions are determinable by means of capacitive, incremental counting down and said positions are locatable in absolute terms and verifiable on the basis of capacitive position reference markers, that is to say by means of a capacitive principle of action. The present capacitive incremental linear encoder, compared with capacitive absolute linear encoders, affords the advantage of a significantly simpler position encoding and thus a significantly simpler and more cost-effective scale and simpler, energy-saving and faster evaluation of the scanning or coupling signals. Like the incremental position determination, the absolute location of the positions can be carried out by means of a capacitive principle of action, which simplifies the construction of the linear encoder and thus makes the linear encoder more cost-effective. A multiplicity of position reference markers distributed on the scale advantageously make it possible that the positions located in absolute terms are checkable and, if appropriate, correctable on the basis of the position references, such that errors in the incremental position determination can be compensated for. Consequently, the requirements made of the precision of the incremental position determination and thus of the scale are significantly lower than in the case of capacitive linear encoders according to the prior art. Since only low requirements have to be made of such a scale, the latter can be produced with inexpensive materials and can be produced and mounted with relatively large tolerances, which leads to considerable cost advantages over comparable capacitive linear encoders according to the prior art. Moreover, it is advantageous that the position reference markers do not per se provide an absolute position reference, that is to say that not every position reference marker by itself provides an absolute position reference, as a result of which absolute codes, which are comparatively complex, are dispensed with. Rather, according to the invention, the absolute position reference results from the stored distances of the position reference markers with respect to one another and with respect to an absolute reference point. This affords advantages particularly if, as preferred, the position reference markers are distributed uniformly, that is to say the distance between the position reference markers is always identical. Therefore, since the scale seen in this way consists of a stringing-together of identical segments, in such preferred embodiments the scale, in accordance with the measurement stroke required for the specific application, can easily be cut off in a corresponding length from an "endless" scale. Such "endless" scales are producible particularly cost-effectively.

In contrast to capacitive linear encoders according to the prior art, the capacitive position reference markers do not cause any gaps in this track, such that relative positions can be determined on the basis of the increments provided by the track in an undisturbed manner along the entire scale. In the case of position reference markers according to the prior art, such as are proposed e.g. by EP 1173730 B1 in the form of modified receiver electrodes, it is not possible to arrange position reference markers in a distributed manner on the scale since, as a result, the track of the receiver electrodes has gaps and the incremental position determination is thus interrupted. Consequently, in the case of scales with capacitive position reference markers according to the prior art, the capacitive position reference markers are positionable only at the beginning and/or end of the scale. Compared with the prior art, the linear encoder according to the invention affords the advantage that position verification is possible at as many locations of the scale as desired. Since the construction of a scale according to the invention is thus subject to hardly any restrictions with regard to the arrangement of the position reference markers, the present invention additionally affords the advantage that for different measurement tasks and, associated therewith, different requirements made of the linear encoder, scales are modifiable with regard to the position reference markers in a simple manner and thus cost-effectively and rapidly, whereby customer wishes can be complied with very flexibly.

The present invention provides capacitive position reference markers without specially designed receiver electrodes being necessary, as in capacitive linear encoders according to the prior art. By virtue of the present invention, all the second coupling electrodes can be fashioned identically. Consequently, the present invention affords the advantage that in comparison with scales of capacitive linear encoders according to the prior art the scale is constructed in a simplified manner and is thus producible more cost-effectively. In this case, as a further advantage that simplifies production and mounting, the scale is embodied in a passive fashion by virtue of the linear encoder comprising means for feeding back the coupling signals from the scale to the read head, wherein, according to the invention, the position reference markers in such a linear encoder are providable at the scale in an uncomplicated manner and thus cost-effectively by the short circuit of two or more adjacent transfer electrodes which are identifiable by means of third coupling electrodes of the read head.

By virtue of the proposed linear encoder, furthermore, complex means for electrical shielding as in the case of linear encoders according to the prior art are unnecessary. For applications having more stringent precision requirements, linear encoders having simplified shielding are nevertheless provided by the present invention. In embodiments comprising transfer electrodes, shielding is advantageously effected by the fact that the transfer electrodes on the read head side are surrounded by shielding electrodes. In particularly advantageous embodiments, the shielding electrodes serving for shielding are identical to the third coupling electrodes, such that the shielding electrodes in such cases are not additional components, but rather are already present for an identification of the position reference markers. The third coupling electrodes therefore provide both means for position reference marker identification and means for shielding the first transfer electrodes serving for incremental position determination, which simplifies the production of the read head and thus makes it relatively cost-effective.

The present invention additionally relates to a method for determining positions for a linear encoder according to the invention. In the context of the method, proceeding from a first relative position of read head with respect to scale, the two units are displaced relative to one another along the feed direction. The scale is capacitively scanned by the read head by means of exchanging coupling signals between the first and second coupling electrodes. The exchanging of the coupling signals is dependent on the respective relative position of the read head with respect to the scale, that is to say that transmitted coupling signals are different depending on the relative position, such that, on the basis of the coupling signals, a relative position is determined as a distance between the first and a second relative position by means of differential signal evaluation of the transmitted coupling signals. In the content of the method, the coupling signals are transmitted by means of the signal transfer means between scale and read head. The transmission takes place substantially independently of the respective relative position in contrast to the exchange of coupling signals between the first and second coupling electrodes.

In one development of the method, at least one position reference marker is identified in the course of the displacement of the scale relative to the read head by means of identification signals. On the basis of the identified position reference marker, the position determined in relative terms by means of the transmitted coupling signals is located in absolute terms and/or a position located in absolute terms is verified. A position located in absolute terms is verified for example on the basis of a second position reference such as a second capacitive position reference marker by means of the distance in the feed direction between the first and second position reference markers. In order to verify the absolute position, the distance in the feed direction between the first and second position reference markers is stored in the control and evaluation unit. Likewise, the distance in the feed direction between further position reference markers is stored in the control and evaluation unit. Preferably, the distance between all the position reference markers is identical.

Optionally, the method according to the invention for a linear encoder comprising at least one third coupling electrode provides a position determining mode. When the position determining mode is implemented, positions are determined incrementally, wherein the coupling signals are evaluated for position determination. Third coupling electrodes are grounded in the position determining mode, and serve as shielding electrodes for shielding the first transfer electrodes. In addition, the method provides a position reference marker identification mode in which, by means of the at least one third coupling electrode, identification signals for identifying position reference markers are transmitted and identification signals for identifying the position reference markers are evaluated, for example in order to locate and verify positions in absolute terms. In this case, the two modes optionally proceed sequentially with respect to one another by means of a time division multiplex method, that is to say that in the course of a relative displacement of scale with respect to read head alternately positions are determined and also position reference markers are identified and at the beginning of one mode it is not necessary to wait for the end of the other mode. In this regard, position determination and position reference marker identification take place alternately, e.g. in the course of the relative displacement. This is effected for example following defined time intervals. Alternatively or additionally, a change to the position reference marker identification mode takes place depending on the displacement distance covered, wherein optionally on the basis of the position determined in the position determining mode a change is made to the position reference marker identification mode predicatively in order to identify a position reference marker assumed at this position.

By means of a time division multiplex method, in a further development of the method by means of time division multiplex methods the transmission of coupling signals for different coupling signal phases takes place in a manner temporally offset with respect to one another, which affords advantages with regard to the coupling signals being free from disturbances and with regard to the signal processing.

As a further option, in the context of the method, the amplitudes of the coupling signals are taken into account during the evaluation thereof. As a result, deviations of the shapes or positions of the coupling electrodes from ideal shapes or ideal positions are compensated for, whereby increases in precision or larger manufacturing tolerances are advantageously achieved.

The present invention furthermore comprises a computer program product or computer data signal, embodied by an electromagnetic wave, comprising program code, for controlling or carrying out the method for determining and verifying positions.

BRIEF DESCRIPTION OF THE DRAWINGS

The capacitive linear encoder according to the invention and the method according to the invention for determining and verifying positions are described in greater detail purely by way of example below on the basis of example embodiments illustrated schematically in the drawing.

Specifically in the figures.

DETAILED DESCRIPTION

Figure 1:
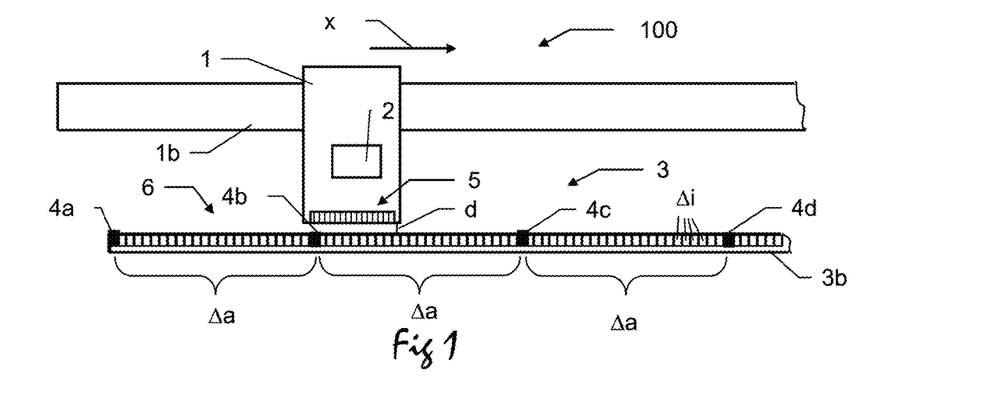
FIG. 1 schematically shows a first embodiment of a linear encoder according to the invention.

FIG. 1 shows a capacitive linear encoder 100 according to the invention comprising a read head 1 for capacitively scanning the scale 3 fitted on the scale carrier 3b, wherein the read head 1 is movable by means of a rail 1b relative to the scale 3 in the feed direction x. The read head 1 has a control and evaluation unit 2 and a multiplicity of first coupling electrodes 5, embodied in the example as emitter electrodes 5, which are driven with temporally changing coupling signals, for example by means of AC voltage or switch-on processes. The distance d between the read head 1 and the scale 3 is dimensioned in such a way that the first coupling electrodes 5 couple capacitively to second coupling electrodes 6, embodied in the example as receiver electrodes 6, of the scale 3 and the temporally changing coupling signals are exchanged between the first and the second coupling electrodes 5 and 6, respectively. In the example, the exchange is carried out by the coupling signals that are emitted by the emitter electrodes 5 being received by the receiver electrodes 6. Alternatively, temporally changing coupling signals are emitted by the second coupling electrodes and received by the first coupling electrodes. The exchange of the coupling signals or the received coupling signals is dependent on the relative position of the emitter electrodes 5 with respect to the receiver electrodes 6 and thus on the relative position of the read head 1 with respect to the scale 3. The position determination is carried out by differential signal evaluation of the exchanged coupling signals by the control and evaluation unit 2. With regard to the differential evaluation of the coupling signals, the receiver electrodes 6 are subdivided into two reciprocal types (e.g. "positive" and "negative"), wherein respective next but one receiver electrodes from among the multiplicity of receiver electrodes 6 are of the same type.

The receiver electrodes 5 in this case form increments $\Delta i$, the length of which is stored in the control and evaluation unit 2, such that a relative position is calculated as the extent of a displacement of read head 1 with respect to scale 3 from a first relative position of read head 1 with respect to scale 3 to a second relative position by counting down the increments $\Delta i$ between the two relative positions. Such a relative position is located in absolute terms by virtue of the fact that the first relative position corresponds to an absolute reference point, preferably to a defined zero point, as absolute position reference or can be uniquely related to a further relative position corresponding to the absolute reference point. Such a zero point as absolute reference point for absolute location of the positions obtained by counting down the increments is defined in the example by the position reference marker 4a, which is situated expediently, but not necessarily, at the beginning of the scale 3. The position reference marker 4a is likewise capacitively, e.g. scannable capacitively by the read head 1. In the context of a position determination, proceeding from a first relative position, the read head 1 is displaced relative to the scale 3 into a second relative position, wherein, by means of the read head 1, the position reference marker 4a is scanned and the number of increments $\Delta i$ between the first and second relative positions is counted on the basis of the coupling signals. The position sought is locatable in absolute terms from the number of increments $\Delta i$ between the zero point and the second relative position.

For verifying the position located in such a way, the scale 3 has further capacitive position reference markers 4b-4d distributed on the scale 3. In this case, the distribution of position reference markers 4a-4d has a minimum density, i.e. a minimum number of position reference markers 4a-4d per unit length. The position reference markers 4a-4d are distributed in a defined manner, that is to say at well-known locations of the scale, for which purpose they are uniformly distributed, i.e. spaced apart equally from one another, in the example. Depending on the total length of the scale 3 and requirements made of the precision of the position determination, the distance $\Delta a$ from one another is, for example, between 5 cm or 50 cm, e.g. 10 cm or 20 cm, or between 1 cm and 100 cm, and is stored in the control and evaluation unit 2. By detecting at least one position reference marker 4b-4d in addition to the position reference marker 4a defining a zero point, an absolute position reference is provided on the basis of the stored distance $\Delta a$ and serves to verify a position determined incrementally and located in absolute terms, as described, i.e. to check it for errors which can arise e.g. when counting down the increments $\Delta i$ and/or on account of manufacturing inaccuracies of the scale 3. The linear encoder 100 according to the invention thus provides means for verifying the positions determined, as a result of which requirements made of the manufacturing accuracy of the scale 3 or the scale carrier 3b are reduced in comparison with capacitive linear encoders 100 according to the prior art or positions are determinable more precisely with the same manufacturing accuracy. It goes without saying that the position reference markers 4b-4d according to the invention can also serve for verifying a relative position, i.e. position not located in absolute terms, by at least two position reference markers 4b-4d being detected in the course of a relative displacement of the scale 3 with respect to the read head 1.

The scale 3 according to the invention is passive. The receiver electrodes 6 are therefore not directly connected to the control and evaluation unit 2. In order to feed the coupling signals received from the emitter electrodes 6 to the control and evaluation unit 2, the scale 3 and the read head 1 have signal transfer means which transmit coupling signals between the scale 3 and the read head 1. In the example, therefore, the coupling signals received by the scale 3 are fed back to the read head 1 by means of the signal transfer means, from where the coupling signals are fed to the control and evaluation unit 2. According to the invention, signal transfer means on the scale side serve to form the position reference markers 4a-4d, for which purpose one or a plurality of signal transfer means are modified at locations which define a position reference. These modified signal transfer means are identifiable by means of identification signals controlled by the control and evaluation unit. The provision of position reference markers by means of modified signal transfer means affords the advantage that the incremental track is not interrupted or disturbed by the position reference markers 4a-4d, which actually makes it possible in the first place to fit further position reference markers 4b-4d in addition to at the beginning and/or end of the scale. The position reference markers 4a-4d do not lead to any obstruction of the track formed by the receiver electrodes 6 which would impair the determination of the relative positions. That is to say that even in the event of the read head 1 being displaced beyond locations of the scale 3 which have position reference markers 4a-4d, the counting down of the increments Δi can be carried on continuously. The scale 3 therefore has both capacitive position reference markers and a continuous incremental track.

Figure 2A:
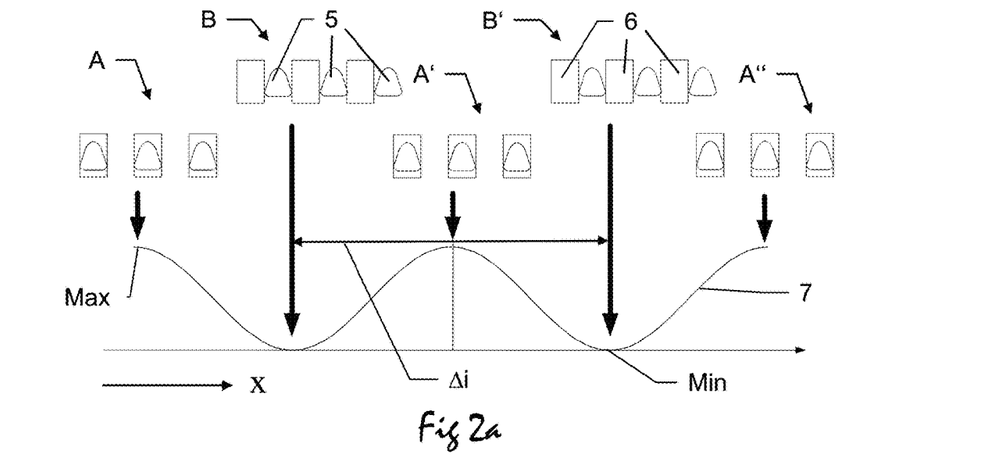
FIGS. 2a-c show schematic examples of the configuration and arrangement of the receiver electrodes and emitter electrodes.

FIG. 2a schematically shows an example of the configuration of the receiver electrodes and emitter electrodes. The illustration shows as an excerpt from the linear encoder in five different relative positions A, A', A", B and B' of scale with respect to read head in each case three emitter electrodes 5 as an excerpt from the read head and in an overlapping manner in the drawing in each case three rectangular receiver electrodes 6 of one type as an excerpt from the scale. For the sake of simplicity, the likewise rectangular receiver electrodes of the reciprocal type arranged between the receiver electrodes 6 of the illustrated type are omitted in FIG. 2a. For a sinusoidal characteristic of the transmitted coupling signals, the receiver electrodes 6 have the rectangular shape illustrated and the emitter electrodes 5 have the sinusoidal shape illustrated, wherein the width as (maximum) extent in the feed direction x of the receiver electrodes 6 and that of the emitter electrodes 5 are coordinated with one another, in the example by the width being at least approximately identical. Consequently, in the case of a relative movement in the feed direction x of scale with respect to read head, and thus of the first with respect to the second coupling electrodes 5 and 6, respectively, transitions occur from states of a complete superimposition of emitter electrodes 5 with receiver electrodes 6 of one polarity (relative positions A, A' and A") to states in which there is no superimposition (relative positions B and B'). This results in the illustrated sinusoidal profile of the coupling signal 7 of a defined phase with maxima of the signal amplitude for complete superimposition in the relative positions A, A' and A" and minima for relative positions B and B' without superimposition. The coupling signals 7 transmitted between the first and second coupling electrodes contain the information about the position as relative position of scale with respect to read head. By signal evaluation of the coupling signals 7 transmitted between the first and second coupling electrodes, a position is determinable incrementally, wherein an increment Δi is defined by the distance between two maxima (or minima) resp. period length of the coupling signal 7.

The amplitudes of the individual coupling signals are optionally taken into account in the evaluation thereof, whereby deviations from an ideal electrode geometry such as deviations from ideal positions of the receiver electrodes 6 and/or emitter electrodes 5 on the scale and/or the read head and/or deviations from ideal electrode shapes, e.g. deviations from the ideal rectangular and/or sinusoidal shape, can advantageously be compensated for.

Figure 2B:
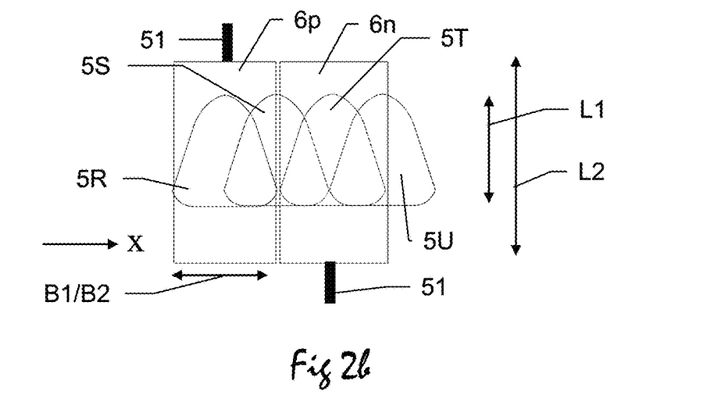

FIG. 2b shows as a further overlapping excerpt from scale and respectively read head a theoretical (i.e. not implementable in practice) relative arrangement of receiver electrodes 6p and 6n as second coupling electrodes of both types with respect to emitter electrodes 5R-5U as first coupling electrodes. The emitter electrodes 5R-5U are driven with temporally changing signals, e.g. in the form of AC voltage signals having identical amplitude and frequency, and have four different coupling signal phases R, S, T and U. By means of capacitive coupling, the coupling signals are received by the receiver electrodes 6p and 6n and are fed via the contacts 51 having different polarities indirectly via the signal transfer means to an evaluation unit such as the control and evaluation unit of the linear encoder for differential evaluation.

As already mentioned, the width B1 of the receiver electrodes 6p and 6n is equal to the width B2 of the emitter electrodes 5R-5U at the wide end thereof. In order to take account of edge effects, it can alternatively be advantageous to keep the width B2 of the emitter electrodes 5R-5U somewhat smaller than the width B1 of the receiver electrodes 6p, 6n. For compensation of the lateral offset of the scale with respect to the read head, the receiver electrodes 6p and 6n advantageously have, as illustrated, a radial extent L2, that is to say length along the longitudinal axis, which is greater than the radial extent L1 of the emitter electrodes 5R-5U of the same sensor ring. As a result of the radial alignment of the emitter electrodes 5R-5U and receiver electrodes 6p and 6n and the different lengths L1 and respectively L2 thereof, even in the event of a deviation—caused by lateral offset—from an ideal position of the read head with respect to the scale transversely with respect to the feed direction x in all relative positions of scale with respect to read head, a capacitive coupling that is at least largely uninfluenced by said deviation is ensured.

The four different phases RSTU of the first coupling electrodes displaced geometrically with respect to one another are offset with respect to one another. With the use of four of such phases RSTU offset by 90°, the corresponding emitter electrodes 5R-5U would have to be arranged as illustrated such that emitter electrodes are respectively superimposed with the next phase, e.g. the emitter electrodes 5S with the emitter electrode 5R and the emitter electrodes 5T with the emitter electrodes 5S. Since this is not possible in practice, of course, emitter electrodes are selectively omitted by means of a phase permutation, as illustrated in the subsequent FIG. 2c.

Figure 2C:
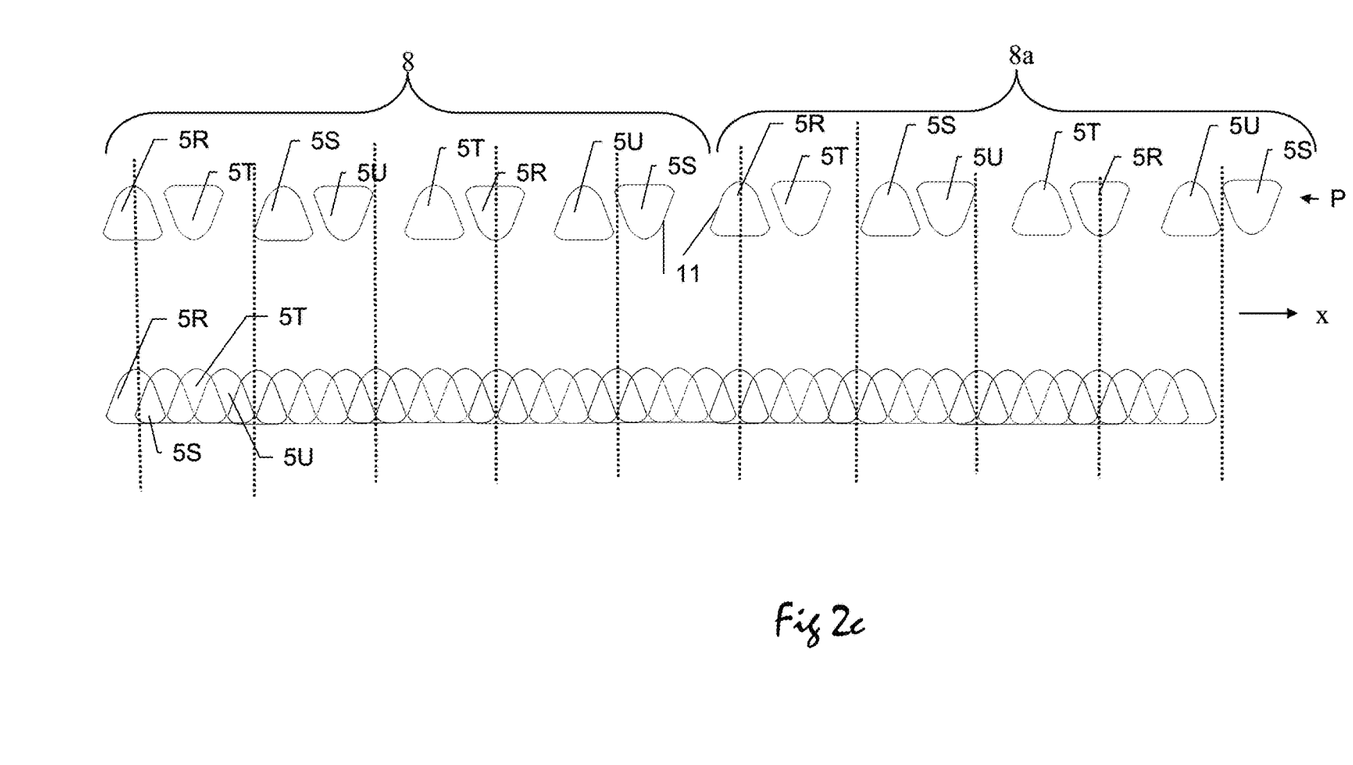

FIG. 2c shows at the bottom the arrangement—impossible in practice—of first coupling electrodes being superimposed as emitter electrodes 5R-5U from FIG. 2b with the simple sequence of phases RSTU continued in the feed direction x, the arrangement from FIG. 2b being repeated nine times. The dashed vertical lines indicate in each case emitter electrodes of the same phase 5R. By means of the principle of phase permutation described below, emitter electrodes are then omitted from these thirty-six emitter electrodes in a targeted manner.

FIG. 2c illustrates at the top an example of a phase permutation P. In the case of this phase permutation P, from respectively 20 successive emitter electrodes respectively 2 emitter electrodes of each phase are retained, the other three being omitted. This results in a permutation interval 8, referred to as P-interval for short, with the phase sequence R-T-S-U-T-R-U-S. There is a uniform distribution of the four phases over the entire P-interval 8 and thus over the entire read head. After the end of a P-interval 8, this phase or emitter electrode sequence is respectively repeated over the entire read head, as indicated by the next P-interval 8a in FIG. 2c at the top.

In order to obtain an electrically sufficiently isolating distance between the emitter electrodes 5R-5U that remained, in conjunction with, nevertheless, a compact arrangement of the emitter electrodes 5R-5U, respectively directly adjacent emitter electrodes 5R-5U advantageously have a radial alignment in opposite directions, that is to say that the respective next but one emitter electrodes 5R-5U are rotated by 180° in comparison with the respective next emitter electrodes 5R-5U, as illustrated in FIG. 2c. The opposite edges 21 of adjacent emitter electrodes 5R-5U are optionally shaped such that they are approximately straight, whereby emitter electrodes 5R-5U can be arranged compactly along the feed direction x. In this case, protective electrodes for mutual shielding are in each case situated optionally between the and/or around the emitter electrodes 5S-5U. Alternatively or additionally, the distance between the emitter electrodes 5R-5U is dimensioned to be sufficiently large. As a further alternative or additional measure, emitter electrodes of one coupling signal phase, e.g. all the emitter electrodes 5R, are driven, by means of a time division multiplex method, in a manner temporally offset with respect to the driving of the emitter electrodes of the other phase, that is to say e.g. the emitter electrodes 5S-5U, as a result of which mutual disturbances of the coupling signals are avoided.

Figure 3:
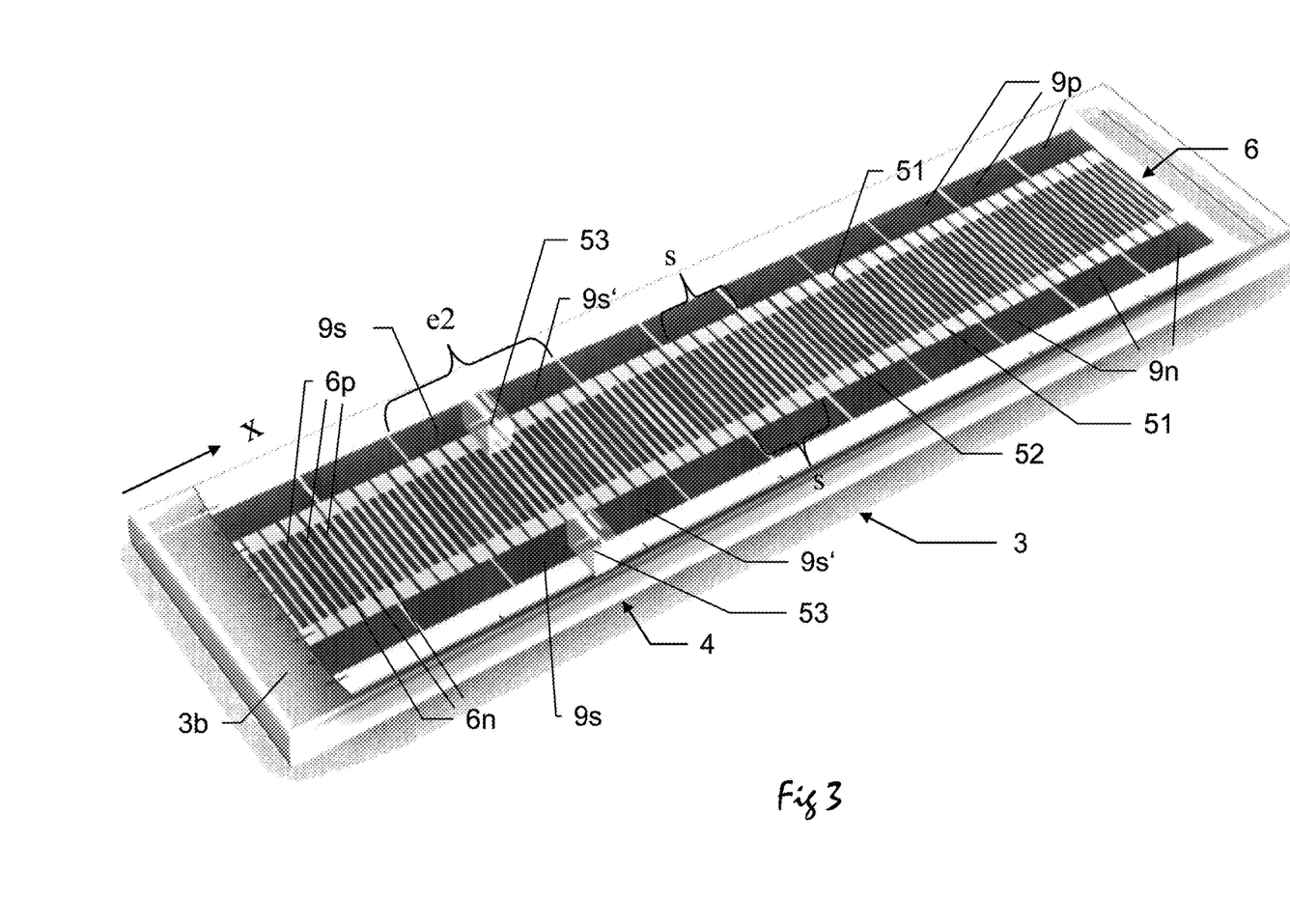
FIG. 3 shows a schematic example of a scale according to the invention.

FIG. 3 shows an excerpt from a scale 3 according to the invention on a scale carrier 3b in oblique view. The rectangular emitter electrodes 6 form a track in the feed direction x and are subdivided into emitter electrodes of one type 6p and emitter electrodes of the other type 6n, wherein every second emitter electrode 6 is of the same type. The individual emitter electrodes 6 are electrically isolated from one another by isolations 52. The scale 3 is passive. In order to feed the coupling signals received from the emitter electrodes 6 to the control and evaluation unit, the scale 3 and the read head have signal transfer means. In the embodiment illustrated, the signal transfer means on the scale side are embodied as a multiplicity of identical second transfer electrodes 9p and 9n, which couple capacitively to first transfer electrodes of the read head (see FIG. 4) in order to transfer coupling signals between the scale 3 and the read head. In contrast to the position-dependent exchange of the coupling signals between the emitter electrodes and the receiver electrodes 6p, 6n (see FIG. 2a), the transmission of coupling signals between the transfer electrodes is at least substantially independent of the relative position of scale-read head, since, after all, the coupling signal transmission does not pursue the purpose of obtaining information on the basis of which the relative position of scale with respect to read head is determinable.

The second transfer electrodes 9p, 9n are subdivided into two types 9p and 9n in a manner corresponding to the different types of the receiver electrodes 6p, 6n, wherein the second transfer electrodes 9p are arranged on one side of the receiver electrodes 6p, 6n and the second transfer electrodes of the other type are arranged on the other side and are electrically conductively connected via contacts 51 in each case to at least one receiver electrode 6p, 6n of the same type. Moreover, the receiver electrodes 6 are fashioned congruently with respect to one another, that is to say identically, independently of their type. In the example, all the receiver electrodes 6 are identically rectangular. In the embodiment according to FIG. 3, the second transfer electrodes 9p and 9n are in each case connected to a sequence s of adjacent receiver electrodes of the same type 6p and 6n, respectively. The length in the feed direction x of such a sequence s preferably corresponds to the length in the feed direction x of a P-interval on the read head. What is achieved by such coordination of the sequences s with the P-intervals is that the sinusoidal shape of the coupling signals is maintained without additional measures even when coupling signals of the receiver electrodes 6 of a sequence s are combined.

The scale according to FIG. 3 exhibits per type one second transfer electrode 9s and one second transfer electrode 9s' which are adjacent to one another and, unlike the rest of the second transfer electrodes depicted, are not electrically isolated from one another, but rather are short-circuited by means of an electrical connection 53. These short-circuited second transfer electrodes 9s and 9s' or the receiver electrodes 6p and respectively 6n connected via them form a position reference marker 4. Since the capacitive position reference marker 4 is formed by means of modified second transfer electrodes 9s and respectively 9s', the track of the receiver electrodes 6 is not interrupted by a position reference marker 4 according to the invention, and so the incremental determination of relative positions along the entire scale 3 continuously or constantly, i.e. without interruption, is also made possible. Such position reference markers 4 formed from short-circuited second transfer electrodes 9s and 9s' are preferably also found in the further region (not illustrated) of the scale 3, wherein preferably the distance between the position reference markers 4 is constant, that is to say that in the example there are in each case an identical number of second transfer electrodes 9p and 9n isolated from one another between the short-circuited second transfer electrodes 9s and 9s', respectively. The distance between the position reference markers 4 is stored in the control and evaluation unit.

The position reference markers 4 formed on the basis of short-circuited second transfer electrodes 9s and 9s' do not lead to any restriction with regard to the construction of the scale 3. The scale 3 can be designed like a scale without position reference markers according to the prior art, such that the position reference markers 4 do not lead to any narrowing of the design freedom of the scale 3. The read head should merely be modified for detecting or identifying the position reference markers 4 thus formed, as described below with reference to FIG. 4.

Figure 4:
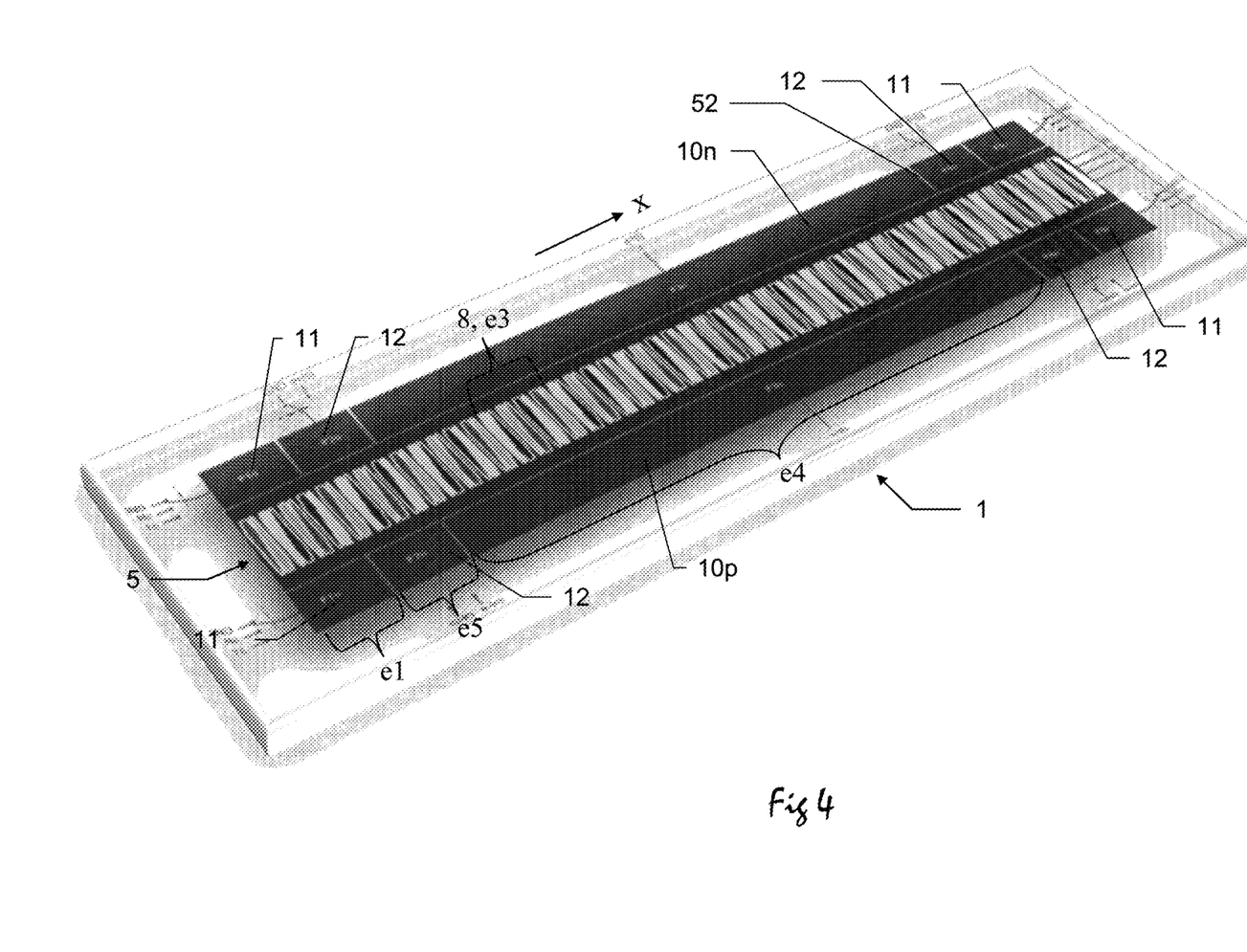
FIG. 4 shows a schematic example of a read head according to the invention.

FIG. 4 shows a read head 1 in oblique view. The read head 1 has emitter electrodes 5 arranged in the feed direction x and in a number of P-intervals 8 in the case of four different coupling signal phases (see FIG. 2c). As signal transfer means for transferring the coupling signals between scale and read head 1, the read head 1 has first transfer electrodes 10n and 10p, wherein the respective transfer electrode 10p or 10n capacitively couples to the second transfer electrodes of the scale (see FIG. 3) of the same type.

In a manner disposed upstream and downstream of the first transfer electrodes 10p and respectively 10n in the feed direction x, the read head 1 has shielding electrodes 12 and third coupling electrodes 11, which are electrically isolated from one another and the first transfer electrodes 10p, 10n. The extent e4 in the feed direction x of the transfer electrodes 10p and 10n is much greater than the extent e1 and respectively e5 of the shielding electrodes 12 and third coupling electrodes 11. However, the shielding electrodes are large enough to serve for shielding the transfer electrodes 10p and respectively 10n, whereby primarily disturbing edge effects at the first transfer electrodes 10p, 10n are avoided. The third coupling electrodes 11 serve for transmitting identification signals for identifying the position reference markers of the scale formed by modified second transfer electrodes (see FIG. 3). Alternatively or additionally, the third coupling electrodes 11 likewise serve as shielding electrodes or are omitted or replaced by further shielding electrodes 12.

As illustrated, the extent in the feed direction x of the first coupling electrodes 5 is approximately of the same magnitude as that of the transfer electrodes 10p and respectively 10n, of the shielding electrodes 11 and of the third coupling electrodes 12 (e1+e4+e5) together. Alternatively, the extent in the feed direction x of the first coupling electrodes 5 is at least longer than the extent e4 of the transfer electrodes 10p and respectively 10n; by way of example, they project beyond the transfer electrodes 10p and respectively 10n by one tenth or one fifth of the extent e4 thereof.

For incrementally determining a position as a relative displacement of the read head 1 with respect to the scale, the linear encoder is operated in a position determining mode. Such a position determining mode is distinguished by the fact that in this case coupling signals exchanged between the first coupling electrodes 5 and the second coupling electrodes 6 and transmitted (received in the example) by the first transfer electrodes 10p, 10n are evaluated for position determination, while the shielding electrodes 12 and third coupling electrodes 11 are grounded in order to shield the first transfer electrodes 10p, 10n.

For identifying the position reference markers, e.g. in order to locate positions in absolute terms and to verify the absolute location thereof, the linear encoder is operated in a position reference marker identification mode, in which the third coupling electrodes 11 are not grounded, but rather transmit, that is to say emit, or receive, identification signals in a manner controlled by the control and evaluation unit. The position reference markers are identified by means of the identification signals. For this purpose, the third coupling electrodes 11 and the short-circuited second transfer electrodes of the scale are coordinated with one another by virtue of the fact that the extent e1 in the feed direction x of the third coupling electrodes 11 and the extent of the second transfer electrodes (extent e2 in FIG. 3), serving as position reference markers are dimensioned in such a way that the identification signals can be tapped off in each case by means of capacitive coupling of short-circuited second transfer electrodes both to a third coupling electrode 11 and to a first transfer electrode 10p or respectively 10n. The short-circuited second transfer electrodes together are therefore of a length such that—in a corresponding relative position or position of the read head 1 with respect to the scale—by means of capacitive coupling they form a bridge between the third coupling electrode 11 and the first transfer electrode 10p or respectively 10n of one type on one side for the purpose of transmitting the identification signals.

If the linear encoder operates in the position reference marker identification mode, therefore, when a position reference marker is crossed, in addition or as an alternative to the coupling signals, the identification signals of the third coupling electrodes 11 of at least one side of the read head 1 (the front or rear side in the feed direction) are received, such that the position reference marker is identifiable on the basis of the evaluation of the identification signals. Consequently, the present invention provides a linear encoder for determining the relative position and for identifying position reference markers.

It goes without saying that the figures shown and explained above only illustrate possible exemplary embodiments schematically. In particular, it is pointed out that the explicitly illustrated and explained examples, without exception, are useable as capacitive linear encoders both separately from one another and in any combination with one another and are also combinable with corresponding devices and methods from the prior art.

The invention claimed is:

1. A capacitive linear encoder for determining positions along a feed direction comprising:
   a read head having a multiplicity of first coupling electrodes arranged along the feed direction,
   a scale having a multiplicity of second coupling electrodes arranged along the feed direction, and
   a control and evaluation unit, wherein:
   read head and scale are displaceable relative to one another in the feed direction,
   the width of the first coupling electrodes and the width of the second coupling electrodes are coordinated with one another,
   the first coupling electrodes have at least three coupling signal phases offset with respect to one another, wherein the sequence of the coupling signal phases is defined by a phase permutation, such that in each case a series of adjacent first coupling electrodes form a P-interval,
   upon control by the control and evaluation unit temporally changing coupling signals are exchanged by capacitive coupling between the first and second coupling electrodes,
   the positions are determinable by the control and evaluation unit by a signal evaluation of the coupling signals exchanged between the first and second coupling electrodes, wherein the second coupling electrodes are divided into at least two mutually reciprocal types for a differential evaluation of the coupling signals, and
   the scale
   is passive, for which purpose the linear encoder comprises capacitive, signal transfer means for transferring the coupling signals between scale and read head, and
   has at least one position reference marker which is formed by means of the signal transfer means, for which purpose signal transfer means are modified at a location of the scale that defines a position reference, for position reference marker identification the position reference marker is identifiable by means of identification signals controlled by the control and evaluation unit.

2. The linear encoder according to claim 1, wherein: the signal transfer means comprises a capacitive signal transfer means.

3. The linear encoder according to claim 1, wherein: the position reference marker comprises a capacitive position reference marker.

4. The linear encoder according to claim 1, wherein: the second coupling electrodes comprise receiver electrodes.

5. The linear encoder according to claim 4, wherein: the read head has at least two third coupling electrodes, wherein at least one third coupling electrode is fitted in a manner disposed upstream and/or downstream of each first transfer electrode in the feed direction, and the third coupling electrodes are usable as shielding electrodes for electrically shielding the respective first transfer electrode, wherein the read head has, between the respective first transfer electrode and the respective third coupling electrodes,
further shielding electrodes serving for electrically shielding the first transfer electrodes.

6. The linear encoder according to claim 1, wherein: the first coupling electrodes comprise emitter electrodes.

7. The linear encoder according to claim 1, wherein: the first coupling electrodes have four coupling signal phases offset with respect to one another by in each case one quarter.

8. The linear encoder according to claim 1, wherein: the positions are locatable in absolute terms on the basis of a reference position marker defining an absolute reference point, and/or
the scale has a plurality of position reference markers in the feed direction, wherein positions located in absolute terms on the basis of the reference position markers are verifiable.

9. The linear encoder according to claim 1, wherein: the signal feedback means are embodied as transfer electrodes, wherein the scale has a plurality of second transfer electrodes per type of the second coupling electrodes, and the read head has at least one first transfer electrode per type of the second coupling electrodes, wherein:
each second transfer electrode is electrically conductively connected to one or a plurality of second coupling electrodes of one type, second transfer electrodes couple capacitively to the at least one first transfer electrode of the same type.

10. The linear encoder according to claim 9, wherein: a respective position reference marker is formed by means of adjacent modified second transfer electrodes, wherein in each case at least two adjacent second transfer electrodes are short-circuited for the modification, wherein:
the read head has at least one third coupling electrode which
is suitable for transmitting identification signals which change temporally, and
by means of capacitive coupling the identification signals are transmittable between the third coupling electrode and second transfer electrodes,
a respective position reference marker is identifiable on the basis of the identification signals.

11. The linear encoder according to claim 10, wherein: the at least one third coupling electrode is fitted to the read head in the feed direction upstream and/or downstream of a first transfer electrode and in a manner electrically insulated therefrom, and the third coupling electrode and the second transfer electrodes are coordinated with one another in such a way that the modified second transfer electrodes serve for transmitting the identification signals between the third coupling electrode and the first transfer electrode.

12. The linear encoder according to claim 11, wherein: the third coupling electrode and the second transfer electrodes are coordinated with one another by virtue of the fact that two or more short-circuited second transfer electrodes have an extent in the feed direction such that with a constant relative position of read head with respect to scale the short-circuited second transfer electrodes are capacitively couplable both to the respective first transfer electrode and to the third coupling electrode, such that a transfer of identification signals transmitted by the third coupling electrode to the control and evaluation unit takes place only in the presence of a capacitive position reference marker in the form of the short-circuited second transfer electrodes.

13. The linear encoder according to claim 12, wherein: the second transfer electrodes are adjacent in the feed direction.

14. The linear encoder according to claim 12, wherein: the read head has shielding electrodes for electrically shielding the first transfer electrodes, whereby disturbances of the coupling signals caused by external or internal sources are at least reduced.

15. The linear encoder according to claim 1, wherein: for robustness relative to deviations from an ideal alignment of the read head with respect to the scale transversely with respect to the feed direction the extent transversely with respect to the feed direction of transfer electrodes coupling to one another of the scale and of the read head differ from one another, and/or
each second transfer electrode is connected to a sequence of second coupling electrodes that are adjacent in the feed direction, wherein the length of each such sequence corresponds to the length over which exactly one of the P-intervals extends on the read head.

16. The linear encoder according to claim 1, wherein: the first and/or second coupling electrodes are surrounded by an electrically shielding protective electrode, and/or
the first and/or second coupling electrodes are coordinated with one another in such a way that a sinusoidal profile of the capacitive coupling is generated by a displacement of the scale relative to the read head, wherein
for as dense an arrangement as possible, mutually facing edges of directly adjacent first coupling electrodes are shaped such that they are approximately straight, and
directly adjacent first coupling electrodes are aligned in opposite directions.

17. A capacitive linear encoder for determining positions along a feed direction comprising:
a read head having a multiplicity of first coupling electrodes arranged along the feed direction,
a scale having a multiplicity of second coupling electrodes arranged along the feed direction, and
a control and evaluation unit, wherein:
read head and scale are displaceable relative to one another in the feed direction, the width of the first coupling electrodes and the width of the second coupling electrodes are coordinated with one another, the first coupling electrodes have at least three coupling signal phases offset with respect to one another, wherein the sequence of the coupling signal phases is defined by a phase permutation, such that in each case a series of adjacent first coupling electrodes form a P-interval, upon control by the control and evaluation unit temporally changing coupling signals are exchanged by capacitive coupling between the first and second coupling electrodes, the positions are determinable by the control and evaluation unit by a signal evaluation of the coupling signals exchanged between the first and second coupling electrodes, wherein the second coupling electrodes are divided into at least two mutually reciprocal types for a differential evaluation of the coupling signals, the scale is passive, for which purpose the linear encoder comprises transfer electrodes as signal transfer means for transmitting the coupling signals from the scale to the read head, wherein the scale has a plurality of second transfer electrodes per type of the second coupling electrodes, and the read head has at least one first transfer electrode per type of the second coupling electrodes, each of the second transfer electrodes is electrically conductively connected to one or a plurality of second coupling electrodes of the same type, second transfer electrodes couple capacitively to the at least one first transfer electrode of the same type, the read head has shielding electrodes for electrically shielding the first transfer electrodes, whereby disturbances of the coupling signals caused by external or internal sources are at least reduced, wherein the shielding electrodes are fitted in a manner disposed upstream and/or downstream of the first transfer electrodes in the feed direction, wherein in relation to a respective first transfer electrode at least one respective shielding electrode is fitted in a manner disposed upstream in the feed direction and one respective shielding electrode is fitted in a manner disposed downstream in the feed direction, and the extent in the feed direction of the arrangement of the first coupling electrodes is greater than the extent of the first transfer electrodes, such that a portion of the first coupling electrodes extends beyond the first transfer electrode in the feed direction, wherein the extent in the feed direction of the arrangement of the first coupling electrodes is at least approximately of the same magnitude as the extent in the feed direction of the respective first transfer electrodes and of the respective shielding electrodes together.

18. A method for determining positions for a linear encoder, the method comprising:
displacing the read head relative to the scale along the feed direction proceeding from a first relative position of read head with respect to scale,
capacitively scanning the scale by means of the read head by means of exchanging coupling signals between the first and second coupling electrodes, wherein the exchanging is dependent on the respective relative position,
transmitting the coupling signals by means of the signal transfer means between scale and read head,
determining with a control and evaluation unit a relative position as distance between the first relative position and a second relative position of read head with respect to scale by means of differential signal evaluation of the exchanged coupling signals.

19. The method according to claim 18, wherein:
in the course of displacing, at least one position reference marker is identified by means of the identification signals and, on the basis of the identified position reference marker, the relative position is located in absolute terms and/or a position located in absolute terms is verified.

20. The method according to claim 18, wherein:
the method provides a position determining mode in which
the coupling signals are evaluated for position determining purposes by the control and evaluation unit, and
third coupling electrodes are grounded and serve as shielding electrodes for shielding the first transfer electrodes, and
provides a position reference marker identification mode in which, by means of the at least one third coupling electrode, identification signals for identifying position reference markers are transmitted and the identification signals for identifying the position reference markers are evaluated,
wherein, by means of the time division multiplex method,
the two modes proceed sequentially with respect to one another, and/or
the transmission of coupling signals for different coupling signal phases takes place in a manner temporally offset with respect to one another.

\* \* \* \* \*